(12) United States Patent
Liedler et al.

(10) Patent No.: US 12,403,981 B2
(45) Date of Patent: Sep. 2, 2025

(54) WHEEL COMPONENT WITH A FIXING RING FOR ATTACHING A BRAKE DISK DEVICE TO A BICYCLE HUB

(71) Applicant: TRICKSTUFF GMBH, Pfaffenweiler (DE)

(72) Inventors: Klaus Liedler, Sölden (DE); Christoph Schedel, Freiburg (DE)

(73) Assignee: TRICKSTUFF GMBH, Pfaffenweiler (DE)

( * ) Notice: Subject to any disclaimer, the term of this patent is extended or adjusted under 35 U.S.C. 154(b) by 617 days.

(21) Appl. No.: 17/656,719

(22) Filed: Mar. 28, 2022

(65) Prior Publication Data

US 2023/0303203 A1    Sep. 28, 2023

(51) Int. Cl.
*B62L 1/00*     (2006.01)
*B62L 1/10*     (2006.01)

(52) U.S. Cl.
CPC ..................... *B62L 1/005* (2013.01)

(58) Field of Classification Search
CPC ....................................................... B62L 1/005
See application file for complete search history.

(56) References Cited

U.S. PATENT DOCUMENTS

| | | | | |
|---|---|---|---|---|
| 6,336,531 | B1 * | 1/2002 | Chou | F16D 65/12 188/26 |
| 2006/0238019 | A1 * | 10/2006 | Yu | F16D 65/12 301/105.1 |
| 2007/0240945 | A1 * | 10/2007 | Hirotomi | F16D 65/12 188/26 |
| 2018/0201339 | A1 * | 7/2018 | Shahana | B62J 45/423 |

FOREIGN PATENT DOCUMENTS

| | | | |
|---|---|---|---|
| DE | 10 2010 035 492 A1 | 3/2012 | |
| EP | 1548318 B1 | 4/2007 | |
| WO | WO-2004088162 A1 * | 10/2004 | B62L 1/005 |

* cited by examiner

*Primary Examiner* — Melody M Burch
(74) *Attorney, Agent, or Firm* — Greer, Burns & Crain, Ltd

(57) ABSTRACT

A wheel component with a fixing ring for attaching a brake disk to a hub shell of a bicycle hub, and with a securing unit for securing the fixing ring, wherein the ring includes a radially-extending fixing unit, and a threaded axially-extending tube unit, to screw the thread of the threaded tube unit on the hub shell, and to attach the brake disk to a hub. The fixing unit includes at least one axial through hole which is configured such that the through hole is at least in partial axial alignment with an axial cavity in the brake disk in the mounted state of the fixing ring, so that the securing arm of the securing unit is insertable into the cavity of the brake disk through the through hole in the fixing unit, so that the securing arm locks the fixing ring to prevent inadvertent detachment of the fixing ring.

25 Claims, 4 Drawing Sheets

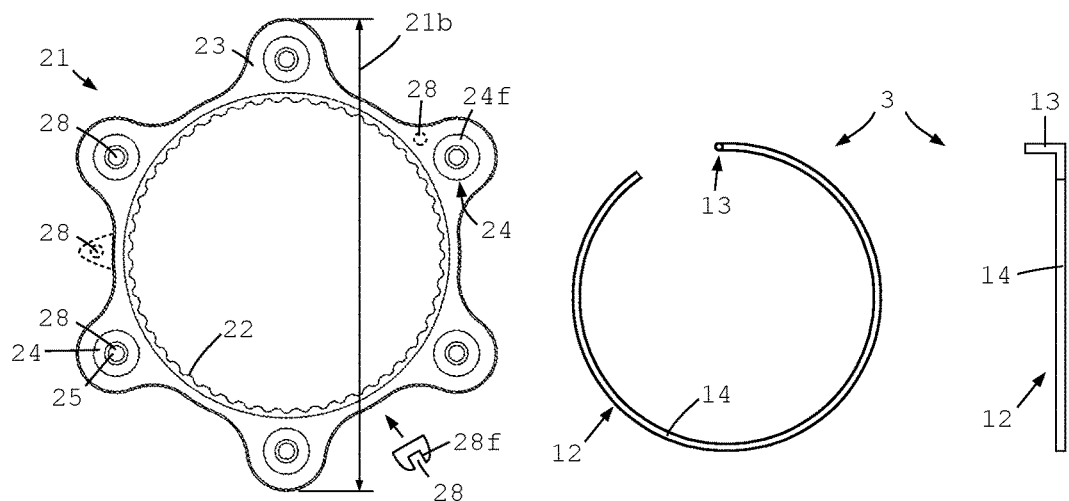
Fig. 7
Fig. 8
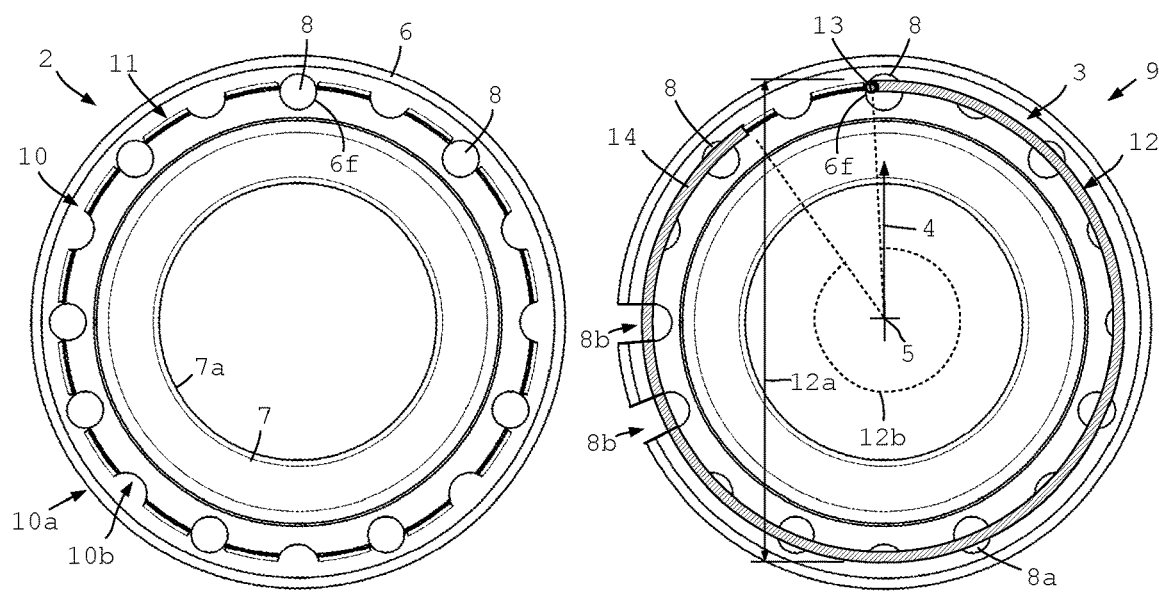
Fig. 9
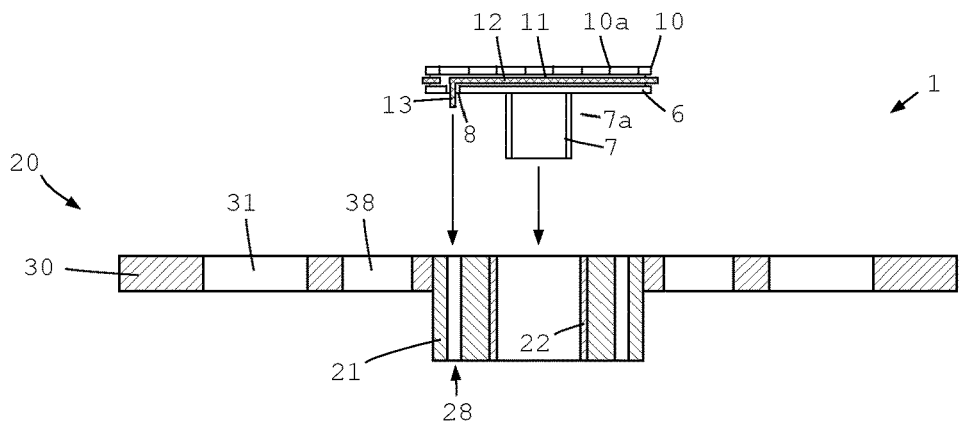
Fig. 10

WHEEL COMPONENT WITH A FIXING RING FOR ATTACHING A BRAKE DISK DEVICE TO A BICYCLE HUB

BACKGROUND

The invention relates to a wheel component with a fixing ring and with a securing unit for securing the fixing ring so as to attach a brake disk device to the hub shell of a bicycle hub.

For decelerating bicycles, a variety of bicycle brakes have been disclosed which operate in different modes of action. In recent years, disk brakes have been increasingly proven in use, wherein friction linings are hydraulically urged against mostly metallic brake disks to achieve the required braking action.

The brake disk is attached indirectly or directly to the wheel hub. For attaching the brake disk to the wheel hub, systems have been disclosed wherein an adapter showing a suitable internal toothing is pushed onto an end region of the hub provided with an external toothing, and is thus non-rotatably coupled with the hub. A fixing ring is screwed into an internal thread of the hub in the axial direction, to thus secure the adapter in the axial direction. Thus, the adapter is accommodated on the bicycle hub non-rotatably and axially fixed. The brake disk in turn is separately fixed to the adapter, or clamped between the fixing ring and the adapter. These systems permit the application of high braking forces in a variety of situations. To ensure a reliable hold of the brake disk on the bicycle hub, the fixing ring must be attached using a suitably high rotational force so that the fixing ring will not automatically detach during use, which would cause unsafe operating situations.

EP 1 548 318 B1 discloses an improvement to these systems, by a device for retaining a bicycle brake disk rotor on a bicycle wheel hub. For mounting, the brake disk adapter provided with the internal toothing is pushed onto the external toothing of the bicycle hub. Thereafter, the brake disk is pushed on the brake disk adapter.

Then, a serrated disk is attached to the brake disk. To this end, click elements of the serrated disk are axially pushed through the brake disk and clicked into the brake disk adapter. This establishes an axial connection between the brake disk adapter and the brake disk. However, the brake disk is not yet accommodated on the bicycle hub secure against loss in the axial direction. Therefore, the fixing ring is screwed into the bicycle hub so as to secure the brake disk on the bicycle hub in the axial direction as well. Then, a fixing ring serration, which axially faces the brake disk, makes frictional contact with the serrated disk between the brake adapter and the fixing ring. When overcoming the elevations of the serration during fixing, the serrations are elastically deformed, thus biasing the fixing ring in the axial direction. To then detach the fixing ring from the attached state, a certain momentum must first be overcome so as to achieve a suitable securing of the fixing ring. The drawback thereof is the increased expenditure due to the different components required. Furthermore, it may happen that the click-in elements for attaching the reference disk to the brake disk adapter break off, so that any securing against inadvertent detachment is eliminated, since the serrated disk and the fixing ring can then rotate jointly.

DE 10 2010 035 492 A1 discloses a similar system where a link member configured as a serrated disk is pushed onto the brake disk connected with the adapter. Then, connection members extend from the serrated disk through the brake disk to the adapter. The rotation lock is effected via the interlocking serrations on the serrated disk and the fixing ring.

Furthermore, the prior art has disclosed a wheel component with a disk brake system, wherein for securing the fixing ring, a setscrew is screwed through the fixing ring into the brake disk adapter, to thus obtain anti-twist protection. The system is functional per se. The drawback thereof is, however, that an additional special tool is required for attaching the setscrew. Moreover, the small setscrew may also detach unnoticed. Due to its small size, its loss tends to remain unnoticed. Finally, it has happened that during brake disk changes the anti-twist protection provided by the setscrew was overlooked, and the fixing ring was detached with excessive force so that the setscrew was sheared off. This may lead to damage to the brake disk adapter or the fixing ring.

SUMMARY

In view of the prior art indicated above, it is the object of the present invention to provide a wheel component with a fixing ring for attaching a brake disk device to the hub shell of a bicycle hub, which enables a safety lock for the fixing ring on a bicycle hub using simple means, in particular no tools.

A wheel component according to the invention comprises a fixing ring for attaching a brake disk device to the hub shell of a bicycle hub. The fixing ring may also be called "lock ring" throughout this application. Furthermore, the wheel component comprises a securing unit for securing the fixing ring. The fixing ring comprises a fixing unit extending (at least partially) in a radial direction, and a tube unit (that may also be called "tubular unit" or "tubular part") extending (at least partially) in an axial direction and having a thread formed thereon, for screwing the thread of the tube unit to a thread in or on the hub shell, and for attaching the brake device to a bicycle hub. The brake disk device is fixed to a bicycle hub in the axial direction in particular by means of the fixing unit. In preferred configurations the fixing unit may be formed as a circumferential (fixing) flange. The tube unit thread is set up and configured to threadably engage with a matching thread in or on the hub shell. The fixing unit comprises at least one axial through hole which is configured and disposed such that the axial through hole is at least in partial axial alignment with a cavity in the brake disk device in the mounted (respectively screw-connected) state of the fixing ring. The cavity is preferably oriented in the axial direction and can be named axial cavity. The securing arm of the securing unit can be inserted in the cavity of the brake disk device through the through hole in the fixing unit, so that the securing arm effects a safety lock for the fixing ring. In this way, the fixing ring is prevented from detaching inadvertently. The (partial) alignment of the through hole and the cavity limits a possible rotational movement of fixing ring. Both the cavity and the axial through hole each have at least partially enclosing walls, where the securing arm may be supported. Thus a relative movement of the fixing ring with respect to the brake disk device and the hub shell is limited.

In a preferred and simple embodiment, the wheel component comprises a lock ring for attaching a brake disk to the hub shell of a bicycle hub. The wheel component comprises a securing unit for securing the lock ring. The lock ring comprises a radial flange (fixing unit), and a tubular part extending in an axial direction and having a thread on the outside for screwing the thread of the tubular part to a thread in the hub shell, and for attaching the brake device to a bicycle hub. The brake disk is fixed to a bicycle hub in the axial direction by means of the radial flange. The outer thread on the tubular part is set up and configured to threadably engage a matching thread in the hub shell. The radial flange comprises at least one axial through hole. That means that on the surface of the radial flange there is at least one axial through hole. The brake disk device comprises at least one cavity. The cavity is oriented in an axial direction. The cavity preferably comprises an opening at an axial end. The axial through hole in the radial flange is configured and disposed such that the axial through hole is at least in partial alignment with the cavity in the brake disk device in the screwed state of the lock ring. In that state, the securing arm of the securing unit can be inserted into the cavity of the brake disk device through the through hole in the radial flange. The walls around the through hole and the cavity limit a possible rotational movement of the securing arm and of the lock ring. Thereby the securing arm effects a safety lock for the lock ring. In this way, the lock ring is prevented from rotating and detaching inadvertently.

The wheel component according to the invention has many advantages. A considerable advantage of the wheel component according to the invention consists in the option of attaching a safety lock not requiring any special tools. To this end, the securing arm of the securing unit is inserted through the axial through hole in the fixing unit into the cavity of the brake disk device, thus establishing an axial connection.

In a preferred embodiment, the securing arm provides an anti-twist protection in at least one direction of rotation. A securing arm, which is inserted through the through hole in the fixing unit into the cavity of the brake disk device, in particular effects an anti-twist protection in at least one direction of rotation. To this end, the through hole and the cavity of the brake disk device are suitably configured to prevent inadvertent detaching of the fixing ring. An anti-twist protection in both directions of rotation is likewise possible.

In a preferred specific embodiment of the invention, the wheel component comprises at least part of a brake disk device. Preferably, a plurality of axial cavities is configured distributed over the circumference of the brake disk device. The securing arm is thus inserted into an axial cavity of a brake disk device in various suitable circumferential spots to effect a safety lock.

Particularly preferably, a plurality of axial through holes is configured over the circumference of the fixing unit. A plurality of axial through holes over the circumference of the fixing unit enables selection of a suitably oriented axial through hole which is at least partially aligned with an axial cavity of the brake disk device for inserting the securing arm of the securing unit and effecting the safety lock. This configuration is particularly advantageous since it achieves greater independence from the brake disk devices used.

Preferably, the distribution of the axial through holes is selected such that a safety lock of the fixing ring is enabled in any angular position of the fixing unit.

Using a plurality of axial through holes over the circumference of the fixing unit and/or using a brake disk device having a plurality of axial cavities over the circumference of the brake disk device enables more flexibility in design. Since the threads are not (necessarily) always aligned the same on the tube unit, a number of axial through holes and/or cavities make sense, so as to require no, or little, rotation of the fixing unit for achieving a (partial) axial overlap and enabling insertion of the securing arm. When using brake disks of various thicknesses, the fixing ring requires different depths of screw connections with the bicycle hub. This changes the circumferential position of an axial through hole respectively the plurality of axial through holes in the screw-connected state. Thus, using a plurality of through holes and/or cavities ensures the providing of an aligned combination of an axial through hole with a cavity. Particularly preferably, the axial through holes are not distributed (exactly) evenly over the circumference. It is also possible to distribute at least some of the cavities irregularly over the circumference. The distribution of the axial through holes is selected such that securing is always/in any position feasible.

In all the configurations and specific embodiments, it is particularly preferred to select a (circumferential and/or radial) distribution of the axial through holes so that the safety lock of the fixing ring is enabled substantially or nearly always or specifically in all the angular positions of the fixing unit. This applies in particular to angular positions which can be expected in the mounted (screw-connected) state. In this respect the distribution can be limited to a partial circumference that is highly probably sufficient. On the whole, the distribution of the axial through holes is preferably configured such that in the mounted state, a safety lock of the fixing ring is achieved, involving a rotational force within the specified range of rotational force. To achieve an orientation that is at least partially aligned, the degree of tightness can be slightly elevated or slightly lowered (in particular within the tolerance range).

In advantageous specific embodiments, the fixing unit comprises at least one fixing section extending in the radial direction, and then the axial through hole or at least one of the axial through holes is preferably configured on or in a fixing section. It is also possible and preferred for an axial through hole to be configured between two adjacent fixing sections. An axial through hole may for example be configured as a radially open groove. The radially open groove can be configured radially inwardly or radially outwardly open. The open groove does not need to extend in the radial direction only but its outline may show a circumferential element.

Preferably the fixing unit is configured as, or comprises, a circumferential fixing flange. The fixing flange preferably runs in complete circles. Alternately it is possible for the fixing flange to show interruptions. Then the fixing flange may be formed by a plurality of fixing sections extending in the radial direction, for example extending outwardly in a star-shape. These fixing sections may be referred to as fixing arms. The fixing sections do not need to run in the radial direction only but they may extend (slightly) in the axial direction, thus generally forming for example a (slight) cone. Then the brake disk or the brake disk device is supported on the radially outwardly ends of the fixing sections or at least in the region of the radially outwardly ends of the fixing sections.

In particularly preferred configurations, the securing arm has an arm diameter smaller than the diameter of the axial through hole and/or the cavity. Then the securing arm can even be inserted if the axial through hole is not in perfect alignment with the cavity. In particular, the cross section of the axial cavity does not need to be entirely cleared. It is sufficient for a proportion of the cross section to be aligned and cleared so as to enable inserting the securing arm.

The fixing ring thread is preferably an external thread and can be screwed into an internal thread of the hub shell. It is also conceivable to have the fixing ring thread configured as an internal thread that threadably engages with an external thread of the hub shell to attach the brake disk device respectively the brake disk to the bicycle hub.

In preferred configurations the fixing ring, and in particular the fixing unit, comprises at least one tool socket. Preferably, the tool socket includes at least one non-round contour to be gripped by an adapted tool. It is also possible for the fixing ring to show two or more different tool sockets. The tool socket may be configured as a tool holder, or it may provide a spanner size, or some other (in particular form-fit) socket for a tool.

In advantageous configurations the securing unit locks the tool socket in the mounted state. In particular, the securing unit locks the tool socket so as to prevent form-fit and/or force-fit placing or applying of the tool (at least as a rule, or in the majority of applying attempts). This is very advantageous, since it prevents inadvertent detaching while the securing unit is still mounted. Otherwise, a "forcible" detaching attempt might cause damage to the securing unit and/or the fixing ring. A mounted securing unit locking the tool socket prohibits destruction of the anti-twist protection in the case of incorrect handling, because the tool cannot be applied at all.

In the mounted state, the brake disk device is preferably disposed on one axial side of the fixing unit, and the tool socket is configured on the other axial side of the fixing unit. In all the configurations, the tool socket may be configured as a type of radial toothing (radially inwardly or radially outwardly).

It is possible and preferred for the tool socket to be radially configured on the tube unit. The tool socket may be configured radially inwardly and/or radially outwardly on the tube unit (or the fixing unit). The tool socket may in particular also be (axially) configured at one axial end.

It is particularly preferred for the tool socket to be configured such that the tool socket can, for example, be gripped by a sprocket tool or a rotor tool. These tools are in common use for bicycles. If an existing tool can be used, the number of further special tools is kept down. Thus, maintenance/repairs do not require another special tool, which increases sustainability and reduces the investment costs.

In particularly preferred configurations, the fixing ring and in particular the fixing unit show a substantially circumferential groove. Particularly preferably the (circumferential) groove runs around the entire circumference. In particularly advantageous configurations, the groove runs in the gripping region of the tool (in the radial toothing).

In preferred specific embodiments, the securing unit comprises a securing spring with a spring body extending (at least in sections) arcuate. Particularly preferably the securing arm protrudes transverse from the spring body. The securing arm may run transverse (perpendicular, or also obliquely) to a plane opened up by the arcuate spring body. It is also possible for at least one section of the spring body to protrude radially from the arcuate spring body.

In all the configurations it is particularly preferred for the securing spring to be configured in a form-fit, and in particular by adhesive bond, and particularly preferably integrally. In simple and particularly preferred configurations the securing unit consists of a resilient wire material, comprising an arcuate spring body, from which an end portion or a section in the vicinity of the end protrudes transversely, forming a securing arm.

Particularly preferably, the securing spring bears flexibly resiliently against the fixing ring in the mounted state. Particularly preferably the spring body encloses the fixing ring.

In particularly advantageous configurations, the circumferential groove is configured on the tool socket, and the securing spring and in particular the spring body is (at least substantially) received in the groove of the tool socket in the mounted state. It is particularly advantageous for the spring body to be received at a resilient bias in the tool socket groove, and for the securing arm to extend from the spring body through the through hole on the fixing unit into an axial cavity of the brake disk device, so as to secure the fixing ring and prohibit its inadvertent detachment.

Particularly preferably, the groove shows dimensions so that in the mounted state, which may be referred to as a secured state, the spring body radially protrudes out of the circumferential groove of the tool socket. The spring body may protrude radially inwardly and/or outwardly from the groove. In the case of a circumferential groove configured on the outer periphery of the fixing ring, the spring body protrudes radially outwardly in the mounted state. In the case of a tool socket configured radially inwardly, however, the spring body protrudes radially inwardly from the circumferential groove. And in the case of a tool socket configured axially outwardly, the spring body can axially protrude (somewhat) from the circumferential (axial) groove.

Particularly preferably, the wall thickness of the spring body is greater than the depth of the circumferential groove. In all the configurations, the spring body may in particular have a round, oval, rounded, or polygonal cross section. Preferably, the cross section of the spring body does not change, or only very little, at least in sections.

In the mounted state, the spring body is particularly preferably received in the tool socket such that the tools cannot be applied to the tool socket. This is achieved in particular in that the spring body changes the resulting contour of the tool socket so that the tool cannot be placed against the tool socket at all, or at any rate not in a form fit or force fit. In this way, with a securing unit mounted, attempts to detach or attach the fixing ring are reliably prohibited. This prevents damage to a wheel component.

In preferred configurations, the wall thickness of the spring body is between 0.5 mm and 3 mm, and/or the external diameter of the securing spring is between 20 mm and 50 mm. The length of the protruding securing arm is in particular between 3 mm and 12 mm. Advantageously, the spring body opens up a plane to which the securing arm is oriented transverse. Alternately, the securing arm may be referred to as a safety section of the spring body.

In particular, in the mounted state, the spring body has an angle at circumference of more than 180°. In particular in the mounted state, the angle at circumference of the spring body is less than 360°. In particularly preferred configurations, the angle at circumference in the mounted state is between 270° and less than 360°, and particularly preferably, the angle at circumference is between 300° or 330° and 355°. With the spring body surrounding the fixing ring, the angle at circumference may also be referred to as angle of contact.

In advantageous configurations, the securing arm, in the mounted state, encloses at least some sections of the fixing ring, and in particular shows a diameter between 40 mm and 50 mm.

In all the configurations, it is particularly preferred for the brake disk device to comprise a (separate) brake disk. A separate brake disk allows exchanging as required. Particularly preferably, a disk holder forms part of the brake disk device. The disk holder can in particular be non-rotatably connected with the bicycle hub and it is preferably configured such that in the mounted state, the disk holder bears against a shoulder of the hub shell (in a form fit). Thus, the disk holder is reliably received in, and supported on, the bicycle hub.

In other configurations it is also conceivable for the disk holder to be connected with the bicycle hub by adhesive bond. It is also possible for the disk holder to be configured integrally with the bicycle hub or the hub shell of the bicycle hub.

Preferably the disk holder shows in all the configurations, a plurality of axially protruding bolts which can receive a brake disk. The cross section of at least one bolt may be round, angular, rounded, or polygonal. The bolts may protrude perpendicular or obliquely from the disk holder. The bolts may be fixedly received in the disk holder, for example press-bonded. The bolts may also be configured integrally with the disk holder. It is also possible and preferred for the bolts to be separate parts received detachable or even manually removable (loosely) on the disk holder.

In particularly preferred configurations, a brake disk is non-rotatably received on the bolts of the disk holder. In this case, the bolts serve as brake disk supports in the mounted state.

In particularly preferred configurations, at least part of the bolts or at least one of the bolts shows a depression, which is accessible in the mounted state, as an axial cavity (at the axial end of the bolt). Preferably, in the mounted state the securing arm engages a depression of a bolt. It is also possible for part of the depressions and/or the bolts to be covered in the axial direction by the fixing ring in the mounted state.

It is also possible and preferred for the securing arm in the mounted state to engage in a brake disk aperture. Then the disk aperture forms the axial cavity. A safety lock of the fixing ring may also be provided by engagement of the securing arm in an axial cavity configured as a disk aperture in the brake disk. This is for example also possible if (only) one anti-twist protection is provided (substantially) in one direction of rotation, and only (slight) automatic return rotation of the fixing ring is enabled. Further return rotation is blocked by the securing arm at the latest following a (small) rotation angle.

It is also possible and preferred to use a (another) cutout in the brake disk as a cavity. Such a cutout may be made in the brake disk for example for weight reasons, or it may be provided for reducing heat transfer from the brake region to the bicycle hub, or for cooling. These configurations also allow the axial cavity to only block unscrewing of the fixing ring. A certain and stronger tightening of the fixing ring might still be possible. Thus, return rotation (in the detaching direction) by less than 0.5° or 1° or 2° or 5° may be enabled until the securing arm makes contact with a side wall of the cavity. However, further rotation by 1° or 2° or 5° or 10° or more may be possible or conceivable in the other direction of rotation (in the fixing direction). A rotational angle limit (fixing) in both directions of rotation may, but does not need to, be provided.

In particularly preferred configurations, one bolt of the disk holder is received in the disk aperture in the mounted state. Preferably all the bolts are received in one disk aperture each of the disk holder.

In all the configurations, multiple axial through holes are preferably provided. Particularly preferably, multiple adjacent through holes show the same circumferential distances. However, it is also preferred for the circumferential distance of at least two adjacent through holes to differ from the circumferential distance of two other adjacent through holes.

A suitable configuration of axial through holes over the circumference may on the whole provide for an axial cavity to be aligned with an axial through hole, in any angular position of the fixing ring relative to a brake disk device, in at least one position, to enable insertion of a securing arm.

If insertion of the securing arm is prohibited in a specific angular position, a suitable (slight) increase or decrease of the tightening momentum of the fixing ring may adapt the angular position of an axial through hole so that an (optionally different) axial through hole is sufficiently aligned with a cavity.

Particularly preferably, the external diameter of the fixing unit is larger than the (mean or typical) diagonal distance of the cavities. For example, with a plurality of (e.g. identical) cavities disposed in a circle, the external diameter of the fixing unit is preferably larger than this circle diameter. Thus, it is ensured that the brake disk is fixed not only radially inwardly of the cavities, which would allow a "baggy" brake disk. If the fixing unit does not only act radially inwardly but (also) in the radially outwardly region of the disk holder (brake disk adapter), an otherwise conceivable bag-like deformation of the brake disk can be prevented.

Another wheel component comprises a bicycle hub with a hub shell and a disk holder part and a separate fixing ring, for attaching a (separate) brake disk to the bicycle hub. The disk holder part comprises bolts that are directed outwardly away from a central hub region. The bolts point (immediately) axially outwards (i.e. are directed outwardly away from the central hub region). The bolts can non-rotatably receive the brake disk. The disk holder part is formed integrally (or made of one single material) with the hub shell, and disposed in an axial end region of the hub shell. A thread is formed on the inner periphery of a longitudinal section of the disk holder part, so as to attach a brake disk in the axial direction to the bicycle hub, by screwing the thread configured on the fixing ring to the thread on the disk holder part of the bicycle hub.

Preferably, this wheel component comprises a brake disk, the brake disk forming a brake disk device with (or on) the disk holder part.

Such a wheel component comprises in particular (at least) one securing unit for securing the fixing ring, the fixing ring comprising a fixing unit extending in the radial direction, and a tube unit extending in the axial direction, on which the thread (on the tube unit) is configured, to screw the thread of the tube unit with the thread (on the disk holder part respectively) on the hub shell, and to attach the brake disk device to a bicycle hub, wherein the fixing unit comprises at least one axial through hole which is configured and disposed such that the axial through hole is at least in partial axial alignment with an axial cavity in the brake disk device when the fixing ring is in the mounted state, so that the securing arm of the securing unit can be inserted through the through hole in the fixing unit into the cavity of the brake disk device, so that the securing arm effects a safety lock for the fixing ring so as to prevent inadvertent detachment of the fixing ring.

In preferred specific embodiments, the fixing ring and the bicycle hub may comprise at least some or all features as described above.

Another wheel component according to the invention comprises a bicycle hub with a hub shell and a brake disk device (in particular with a disk holder configured on, or separate from, the hub shell, and a brake disk) and a fixing ring with a fixing unit for attaching the brake disk device to the hub shell, wherein the brake disk device is non-rotatably received on the hub shell, and wherein a thread of the fixing ring is threadably engaged with a thread on the hub shell for axially attaching the brake disk device to the hub shell. At least one axial through hole in the fixing unit is at least in partial axial alignment with an axial cavity in the brake disk device when the fixing ring is in the mounted state. The securing arm of a securing unit is inserted in the axial cavity of the brake disk device through the through hole in the fixing unit, so that the securing arm effects a safety lock of the fixing ring.

In all the configurations, it is preferred for at least part of the front surface, or the front surface of the bolts, to show a different colour or surface property. For example, the (axial) surface may be configured not black but e.g. in a silver colour. The advantage thereof is greater ease of identifying the holes (depressions) in the bolts during mounting. In the case of entirely black cavities and surrounding material the presence or absence of the cavity in the surrounding material for receiving one end of the securing arm may be difficult. It is also possible to provide an additional surface property, or instead of the colour, a (another) different surface property, e.g. shiny instead of dull.

BRIEF DESCRIPTION OF THE DRAWINGS

Further advantages and features of the present invention can be taken from the description of the exemplary embodiments which will be discussed below with reference to the enclosed figures.

The figures show in:

FIG. 7 the disk holder in FIG. 6;

FIG. 8 the securing unit in FIG. 6;

FIG. 9 a top view of the fixing ring with and without a mounted securing unit;

FIG. 10 another exemplary embodiment of a wheel component according to the application;

DETAILED DESCRIPTION

Figure 1:
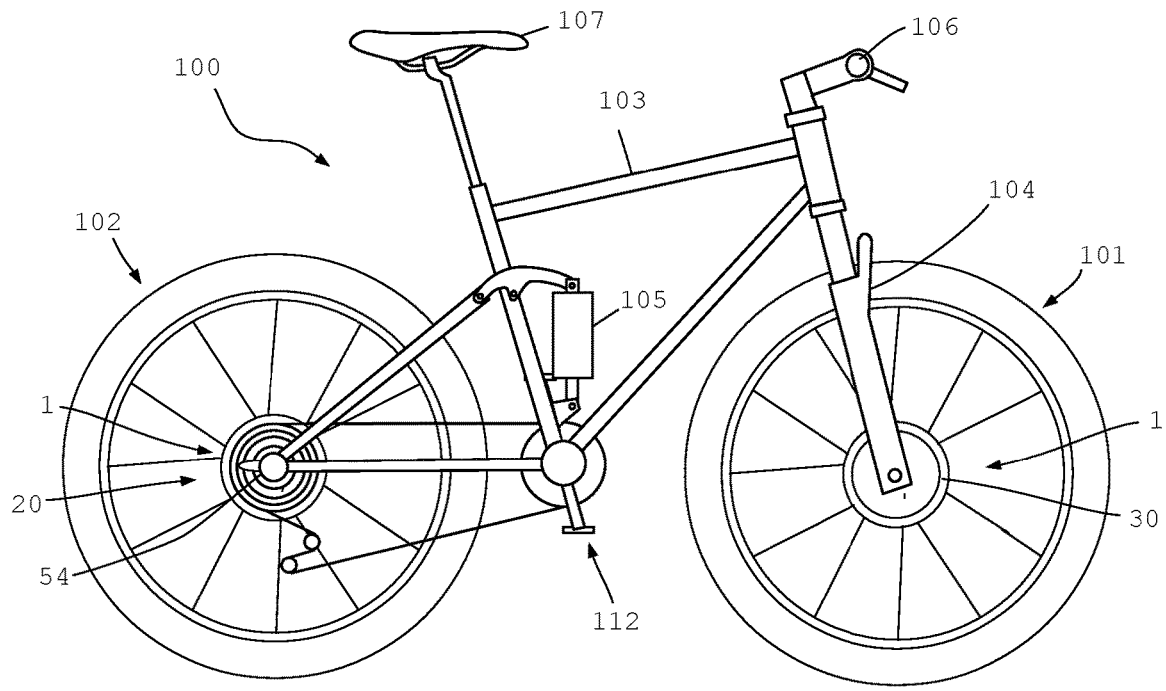
FIG. 1 a schematic illustration of a mountain bike with wheel components according to the application.
Figure 2:
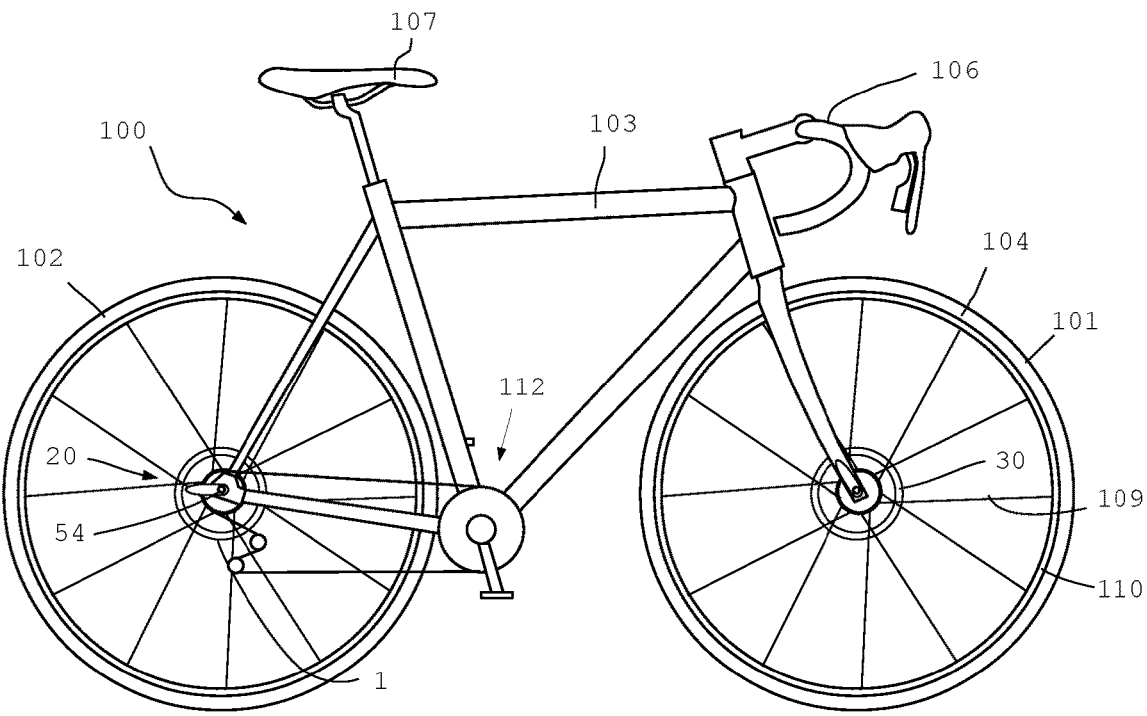
FIG. 2 a schematic illustration of a racing bicycle with wheel components according to the application.

FIGS. 1 and 2 each respectively show a mountain bike and a racing bicycle 100, each equipped with wheel components 1 according to the invention. The mountain bike and respectively the racing bicycle 100 is provided with a front wheel 101 and a rear wheel 102, with a brake disk device 20 each attached, secured by means of a fixing ring 2 not visible in the FIGS. 1 and 2. Each of the two wheels 101, 102 is provided with spokes 109 connecting the rim 110 with the pertaining hub.

A bicycle 100 comprises a frame 103, a handlebar 106, a saddle 107, a fork or suspension fork 104 and in the case of the mountain bike, a rear wheel damper 105 may be provided. A pedal crank 112 with pedals serves for driving. Optionally the pedal crank 112 and/or the wheels may be provided with an electrical auxiliary drive. The hubs of the wheels may be attached to the frame or the fork by means of a clamping system 54 (for example a through axle or a quick release).

Figure 3:
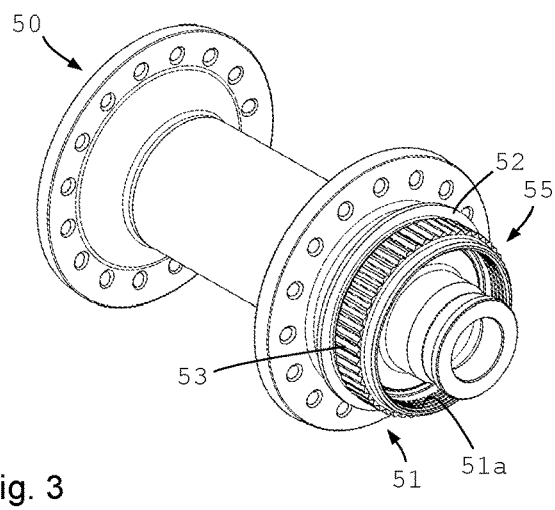
FIG. 3 a perspective illustration of a bicycle hub.

FIG. 3 shows a perspective illustration of a hub respectively bicycle hub 50, presently configured as a front wheel hub. The invention may also be used in rear wheel hubs. The bicycle hub 50 respectively the front wheel hub comprises a hub shell 51 on which an adapter 55 is configured for attaching a brake disk device 20 (see FIG. 6).

To this end, the hub shell 51 comprises a toothing 53, which is configured on the outer periphery of the hub shell 51 and serves as an adapter 55. The adapter is configured on a tube-like section extending axially outwardly on one end of the hub shell. In the inner circumferential region of this tube section forming the adapter 55 for the brake disk device 20, a thread 51a is configured. This thread 51a is an internal thread. A fixing ring 2 is screwed to the thread 51a, after placing the brake disk device 20 on the toothing 53.

Figure 4:
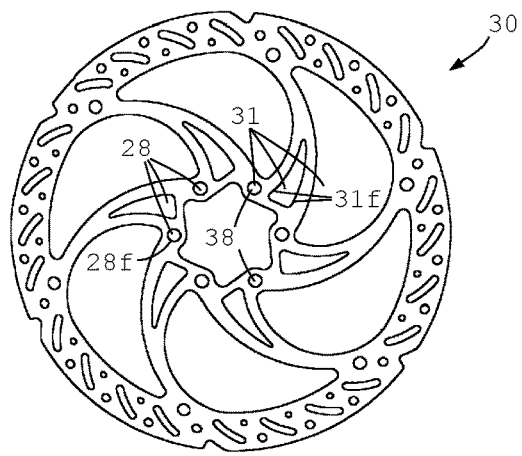
FIG. 4 a schematic illustration of a brake disk.

FIG. 4 shows a schematic side view of a brake disk 30 of a brake disk device 20. The brake disk 30 comprises multiple disk apertures 38 and cutouts 31, wherein each of which can form one cavity 28 for the securing arm 13 of the securing unit 3 of FIG. 5. The cavities 28 or disc openings are each bounded surrounded by a wall 28f. The cutouts 31 are bounded by a wall 31f in the brake disk.

Figure 5:
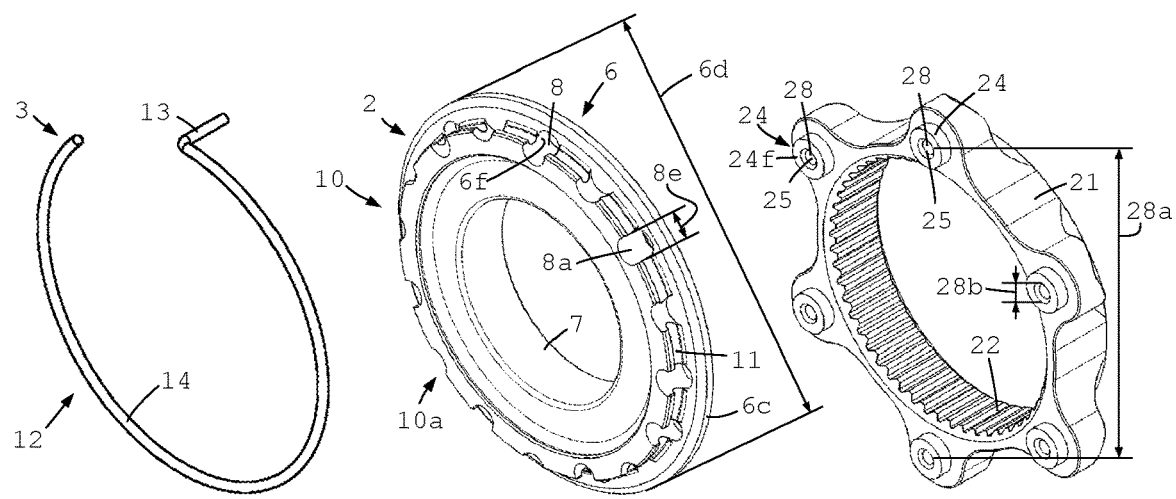
FIG. 5 a perspective illustration of a securing unit, a fixing ring, and a disk holder for the hub according to FIG. 3.

FIG. 5 shows on the left the securing unit 3 for securing the fixing ring 2, shown in the center part in FIG. 5. On the right in FIG. 5, the disk holder 21 of the brake disk device 20 is shown in perspective.

The securing unit 3 comprises a securing spring 12 with an arcuate spring body 14, from which a securing arm 13 protrudes that is configured integrally therewith. The securing unit 3 is provided and configured to be received in the circumferential groove 11 on the fixing ring 2, so as to secure the retaining ring 3 screwed to the bicycle hub 50 against inadvertent detachment.

The fixing ring 2 comprises an axially extending tube unit 7 and a fixing unit 6 extending radially outwardly therefrom in an end region. This fixing unit 6 comprises a circumferential fixing flange 6c with which one brake disk 30 is secured axially outwardly.

One can see in FIG. 5 the tool socket 10 having a non-round contour 10a. The fixing ring 2 can be gripped by the non-round contour 10a in a form-fit and/or force-fit by means of a suitably configured tool 60 (see FIG. 6), so as to reliably screw the fixing ring 2 with the hub shell 51 of the bicycle hub and to apply the rotational force required.

In screwing, the brake disk 30 (for example that in FIG. 4) is reliably secured on the disk holder 21 in the axial direction. After screwing, the securing unit 3 can be mounted. To this end, the spring body 14 of the securing spring 12 is placed in the circumferential groove 11 on the tool contour 10, wherein first the securing arm 13 is passed through aat least one through hole 8 in the fixing unit 6, so that the securing arm 13 engages in a cavity 28 (for example) in the disk holder 21. The securing arm 13 shows an arm diameter 13b (see FIG. 6) which is smaller than the diameter 8e of the axial through hole 8, presently in the shape of a through hole 8a. The arm diameter 13b is in particular also smaller than the diameter 28b of a cavity 28. This enables inserting the securing arm 13 through the axial through hole 8 into the cavity 28, even if the two apertures (8, 28) are not in perfect axial alignment. In particular, the cross section of the cavity 28 does not need to be completely free.

Here the disk holder 21 shows an internal toothing 22, configured to match the external toothing 53 on the hub 50 in FIG. 3. After pushing the disk holder 21 onto the toothing 53, the disk holder 21 is thus non-rotatably coupled with the hub 50. Six bolts 24 are configured on, or inserted in, the disk holder 21, disposed evenly spaced over the circumference at angular distances of 60°, and serving for proper stopping and transmitting the rotational force of the brake disk 30 generated in braking.

The brake disk 30 in FIG. 4 shows corresponding disk apertures 38, again at angular distances of 60°. The diameters of the disk apertures 38 match the external diameters of the bolts 24 of the disk holder 21, so that the brake disk 30 with the disk apertures 28 can be non-rotatably received on the disk holder 21.

Thus, although the brake disk 30 is non-rotatably received on the hub 50, it can still be pulled off the hub 50 in the axial direction. To secure the brake disk 30 in the axial direction as well, the thread 7a of the fixing ring 2 is screwed to the thread 51a of the hub 50. To this end, the tool 60 is placed against the tool contour, and the required rotational force is applied. Thereafter, the securing unit 3 is mounted so that the securing arm 13 protrudes into the depression 25. The depression 25 serves as a cavity for the disk holder 21. The securing arm 13 protrudes through an axial through hole 8. Thus, the brake disk 30 is non-rotatably received at the bicycle hub 50, and is fixed and secure in the axial direction. In the inserted state, a rotational movement of the fixing ring 2 is limited by the fact that the securing arm 13 rests against the wall 6f surrounding the through hole 8a and against the wall 24f of the bolt 24. The securing arm 13 thus limits or prevents relative rotation of the fixing ring 2 to the disc holder 21 or brake disc 30, and thus the brake disc 30 is held in a manner that prevents loss. Also a loosening is prevented.

The fixing unit 6 and here, the fixing flange 6c, shows an external diameter 6d that is larger than the diagonal distances 28a of the cavities 28. Here, the external diameter 6d of the fixing unit 6 is also larger than a circle surrounding the bolts 24 as closely as possible. It is thus ensured that the brake disk is not only pressed in the radially inwardly region, and a bag-like deformation of the brake disk is prevented. The maximum external diameter 21b (FIG. 7) of the disk holder 21 (approximately) corresponds to the external diameter 6d of the fixing unit 6.

Figure 6:
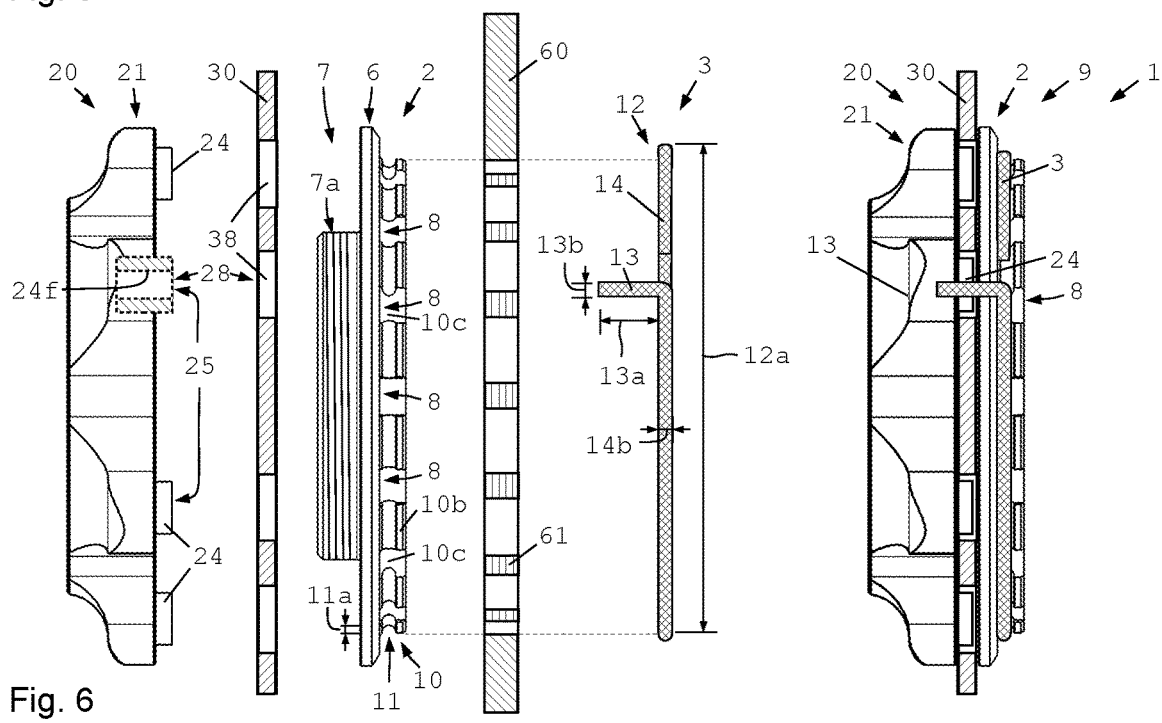
FIG. 6 an exploded view of a wheel component according to the application, and the wheel component in the mounted state.

FIG. 6 shows on the left, an exploded view of the wheel component 1, and on the right, the mounted state 9 of the wheel component 1. On the extreme left, the disk holder 21 of the brake disk device 20 can be seen, from which the bolts 24 protrude axially to the right, away from the surface. The bolts 24 may be configured integrally with the disk holder 21, or may be inserted in the disk holder 21 as separate parts. The bolts 24 preferably show a depression 25 or a central hole, which is presently axially opened to the right, so that the depression 25 can form a cavity 28 for anti-twist protection. The depressions 25 are surrounded by a peripheral wall 24f.

On the right, next to the disk holder 21, a brake disk 30 is schematically illustrated in section. Only a central cutout of the brake disk 30 is shown. In FIG. 6 only a central region of the brake disk of FIG. 4 is shown. The part shown in FIG. 6 approximately corresponds to the central region radially outwardly up to the disk apertures 38, and thus less than half the diameter. It can be seen that the disk apertures 38 in the brake disk match the bolts 24, so that the brake disk 30 can be non-rotatably received on the disk holder 21.

On the right next to the brake disk 30, a fixing ring 2 is shown. The tube unit 7 extends from the fixing unit 6 to the left in the direction of the brake disk 30. The thread 7a can be recognized externally on the tube unit 7, with which the fixing ring is screwed to the bicycle hub 50.

The fixing unit 6 protrudes radially outwardly from the tube unit 7, and serves to axially secure the brake disk 30. The tool contour 10, on which the circumferential groove 11 is configured, follows axially to the right. The depth 11a of the circumferential groove 11 is shown in the drawing. Engagement components 10b are configured over the circumference of the tool contour 10. Axial grooves 10c are configured between the engagement components 10b, which are aligned here with the axial cavities 8.

Further to the right of the fixing ring 2, a simplified tool 60 is shown, which can be applied on the tool contour 10 of the fixing ring 2. Then, the engagement components 61 of the tool 60 engage in the engagement components 10b of the tool contour 10a of the tool socket 10. The closely fitting orientation enables a non-rotatable connection of the tool 60 and the fixing ring 2, so as to allow transfer of high rotational forces to the fixing ring 2. Here the engagement components 61 of the tool 60 are pushed into the axial grooves 10c of the tool socket 10, to attach or detach the fixing ring 2.

After screwing the fixing ring 2 to the bicycle hub 50, an axial through hole 8 in the fixing ring 2 in alignment with a cavity 28 of the brake disk device 20 is found, into which the securing arm 13 of the securing unit 13 is pushed. Thereafter the spring body 14 of the securing spring 12 of the securing unit 3 is inserted in, and clicked into, the circumferential groove 11. Although the spring body 14 of the securing spring 12 clicks firmly into the circumferential groove 11, it can optionally, and as required, be manually lifted out of the circumferential groove 11, to demount the fixing ring 2 if required.

Since the spring body 14 shows a wall thickness 14b greater than the depth of the circumferential groove 11, part of the spring body 14 protrudes radially outwardly. This is another reason why in the mounted state the tool 60 cannot be applied to the tool socket 10. As a result, the securing unit 3 enables a safety lock of the fixing ring 2 and thus, reliable and firm fixing of the brake disk device 20 to the bicycle hub 50, while applying the tool 60 and unscrewing the fixing ring 2 is not enabled until the securing unit 3 is detached.

On the right, the FIG. 6 shows the mounted state 9, representing a secured state. It can be seen that the spring body 14 of the securing unit 3 is received in the circumferential groove 11 on the fixing ring 2, and that the securing arm 13 extends through the axial through hole 8 of the fixing ring 2 into a cavity 28 of the disk holder 21. For better clarity, the securing arm 13 is also shown in the interior of the bolt 24, although it is really surrounded by the bolts 24 and therefore is actually not visible. The securing unit 3 blocks the tool socket 10 in the mounted state 9. Thus, the tool 60 with the engagement components 61 cannot be brought to form-closed engagement with the tool contour 10 for unscrewing the fixing ring 2. Pushing the engagement components 61 into the axial grooves 10c of the tool socket 10 is blocked. Rotation and thus loosening of the fixing ring 2 is prevented by the fact that the securing arm 13 abuts against the walls 6f and 24f.

FIG. 7 shows a top view of a disk holder 21 according to the FIGS. 5 and 6, with some modifications additionally shown in broken lines. On the inner periphery, the disk holder 21 has an internal toothing 22 to non-rotatably connect the disk holder 21 with a bicycle hub 50. Arms 23 protrude radially outwardly, on which one bolt 24 each is configured or received. Here, each of the bolts 24 has a depression 25, wherein each of the depressions 25 can serve as a cavity 28 for a securing arm 13. Each depression 25 is surrounded by a wall 24f of the bolt 24.

The image 7 additionally shows on the top right, in broken lines, a depression (here, circular or oval) or bore as a cavity 28 adjacent to one of the bolts 24. A safety lock of the fixing ring 2 is also feasible by pushing the securing arm 13 into these separate depressions or holes in the body of the disk holder 21.

It is also possible for separate appendices to be configured on the outer periphery, as shown in broken lines on the left in FIG. 7, wherein a separate appendix or a separate arm shows a cavity 28 to take up one end of a securing arm 13. It is also possible for two or more adjacent depressions or cavities 28 to be formed on such an arm or appendix. Such a cavity 28 does not need to be configured as a depression or bore or the like that is entirely surrounded by material. It is also possible to configure such a cavity 28 as a radially open groove. For example, the FIG. 7 shows on the bottom right such an appendix, which may for example be formed integrally with the body of the disk holder 21. A cavity 28 is configured radially outwardly, in which the end of a securing arm can be axially (or radially) inserted to effect an anti-twist protection. Here, the cavity 28 is not fully surrounded by a wall 28f.

FIG. 8 shows a top view of the securing spring 12, with the securing arm 13 at the top end protruding axially, and presently perpendicular to the plane of the drawing. On the right adjacent thereto, a side view can be seen, showing that the arcuate spring body 14 extends within a plane out of which the securing arm 13 projects, here orthogonally.

FIG. 9 shows on the left, a top view of the fixing ring 2 without a mounted securing unit 3, and on the right next to it, a view with a mounted securing unit 3. Some modifications are additionally illustrated on the right. Thus, on the left of the image on the right in FIG. 9, two axial through holes 8 are illustrated as radially outwardly open grooves 8b, which are limited in the circumferential direction by corresponding walls 6f of the fixing unit 6. An axial through hole 8 in the fixing ring 2 does not need to be entirely surrounded by material. The sense and purpose of an axial through hole 8 is to provide a non-rotatable connection. It is sufficient for the axial through hole 8 to be confined by a suitable wall, in at least one peripheral direction and in particular in both peripheral directions. This configuration may also be provided by means of a radially outwardly, or optionally radially inwardly, open wall, and in particular groove.

In the portion on the right of the image in FIG. 9, the spring body 14 of the securing unit 3 is accommodated in the circumferential groove 11, and is retained in the circumferential groove by spring force. The securing arm 13 blocks rotation and rests against the wall 6f. The spring body extends arcuate in the peripheral direction over an angle at circumference 12b of more than 180° and, more than 270°, and even more than 300°. Preferably, the angle at circumference is less than 360°. This facilitates mounting. Here, the securing arm 13 extends through the central top axial through hole 8 into the plane of the drawing, to engage in an axial cavity 28 of the adjacent disk holder 21.

The relationship of the external diameter 12 of the securing spring 12 to the wall thickness 14b of the spring body 14 is higher than 10:1 and in particular higher than 20:1. The spring body 14 consists in particular of a spring-elastic material, and may be of a fibrous composite material, though it is preferably made of metal or steel, and in particular spring steel.

FIG. 10 shows a schematic illustration of another exemplary embodiment of a wheel component 1 according to the invention, wherein the brake disk device 20 may for example show a disk holder 21 which may be connected with the brake disk 30 in a form fit and/or by adhesive bond. Again, the securing arm 13 of the securing unit 3 is guided through an axial through hole 8 in the fixing ring 2 and inserted into an axial cavity 28 which is non-rotatably coupled with the bicycle hub 50. When exchanging the brake disk 30, preferably the entire brake disk device 20 is exchanged.

Figure 11:
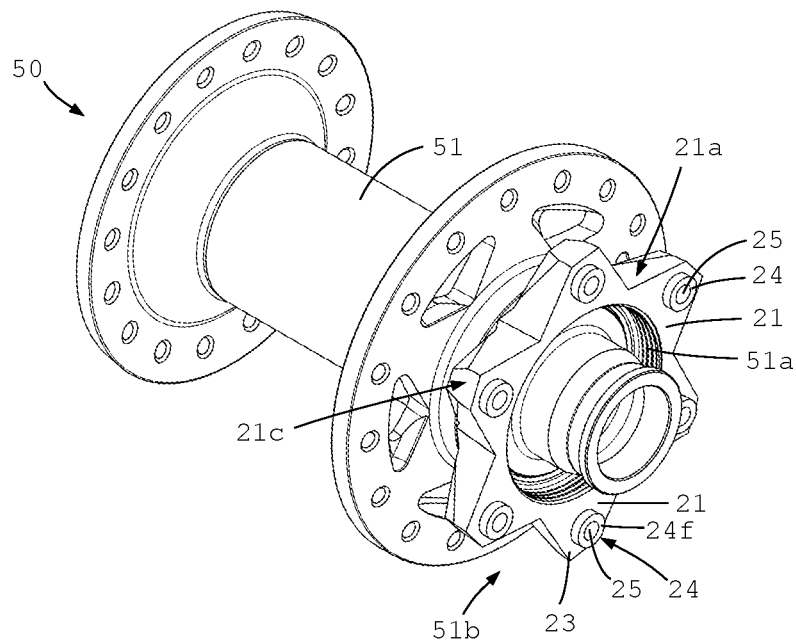
FIG. 11 a perspective view of another bicycle hub.

FIG. 11 shows another exemplary embodiment of a bicycle hub 50, on which a disk holder part 21c is integrally formed. To this end, the disk holder part 21c is preferably integrally made as one piece with the hub shell 51. Again, a thread 51a is configured radially in the interior of the disk holder 21, into which the thread 7a of the tube unit 7 of a fixing ring 2 screws.

The approximately star-shaped disk holder is provided with radial arms 23, where one bolt 24 each is configured or received. Again, the bolts may show a depression 25 each, which serve as axial cavities 28 for the end of a securing arm 13 of the securing unit 3.

The configuration according to FIG. 11 shows a configuration according to the application, of a wheel component 1 with a bicycle hub 50, comprising a hub shell 51, and a disk holder part 21c, and a fixing ring 2, for attaching a separate brake disk 30 to the bicycle hub 50. Axially outwards of the disk holder 21 (away from a central hub region), six bolts 24 protrude, which can non-rotatably take up the brake disk 30 in the six disk apertures 38 matching the bolts (see FIG. 4). Here the disk holder part 21c is configured integrally and in particular made of a single material with the hub shell 51, and disposed on an axial end region 51b of the hub shell 51. The inner periphery of a longitudinal section 21a of the disk holder part 21 shows a thread 51a. By screwing the thread 7a formed on the fixing ring 2 with the thread 51a, a brake disk 30 is attached to the bicycle hub 50 in the axial direction. The brake disk 30 is non-rotatably accommodated by the bolts 24 engaging the disk apertures 38. The brake disk 30 with the disk holder part 21 forms a brake disk device 20.

The disk holder part 21c may also have only three, four, or five arms extending in a radial direction. The disk holder part 21c may also have seven, eight, nine, ten or more arms. Each arm may comprise a bolt for receiving a hole in a brake disc. Each or at least a part of the bolts may comprise a cavity therein to receive a securing arm 13.

A securing unit 3 serves for securing the fixing ring 2. The fixing ring 2 comprises a fixing unit 6 extending in the radial direction 4, and a tube unit 7 extending in the axial direction, where the thread 7a is configured to screw the thread 7a of the tube unit 7 with the thread 51a on the disk holder part 21c respectively on the hub shell 51, and to attach the brake disk device 20 to a bicycle hub 50. The fixing unit 6 comprises at least one axial through hole 8 which is configured and disposed such that the axial through hole 8 is at least in partial axial alignment with an axial cavity 28 in the brake disk device 20 when the fixing ring 2 is in the mounted state, so that a securing arm 13 of the securing unit 3 can be inserted into the cavity 28 of the brake disk device 20 through the through hole 8 in the fixing unit 6, so that the securing arm 13 effects a safety lock for the fixing ring 2 so as to prevent inadvertent detachment of the fixing ring 2. In particular, the fixing arm 13 projects into a depression 25 of a bolt 24. Relative rotation is prevented by the wall 24f of the bolt 24.

The embodiment of FIG. 11 has many advantages. The bicycle hub 50 uses a reduced number of parts. The construction of the bicycle hub 50 is easier and the weight can be reduced. A separate torsionally rigid connection between the hub shell 50 and disk holder part 21c is not required, since they are formed in one piece. The disk holder part 21c is an integral part of the hub. A brake disk can be directly applied and mounted to the bolts 24 at the disk holder part 21. The disk brake can be mounted rotationally fixed to the hub. The fixing ring 2 of FIGS. 5 and 6 is used to fix the disk brake in the axial direction. The thread 7a of the fixing ring 2 of FIG. 6 is screwed into the inner thread 51a formed in the interior of the hub shell 51. The inner thread 51a is located at an axial end of the hub 50, where the disk holder part 21c is formed at the hub shell 51.

Figure 12:
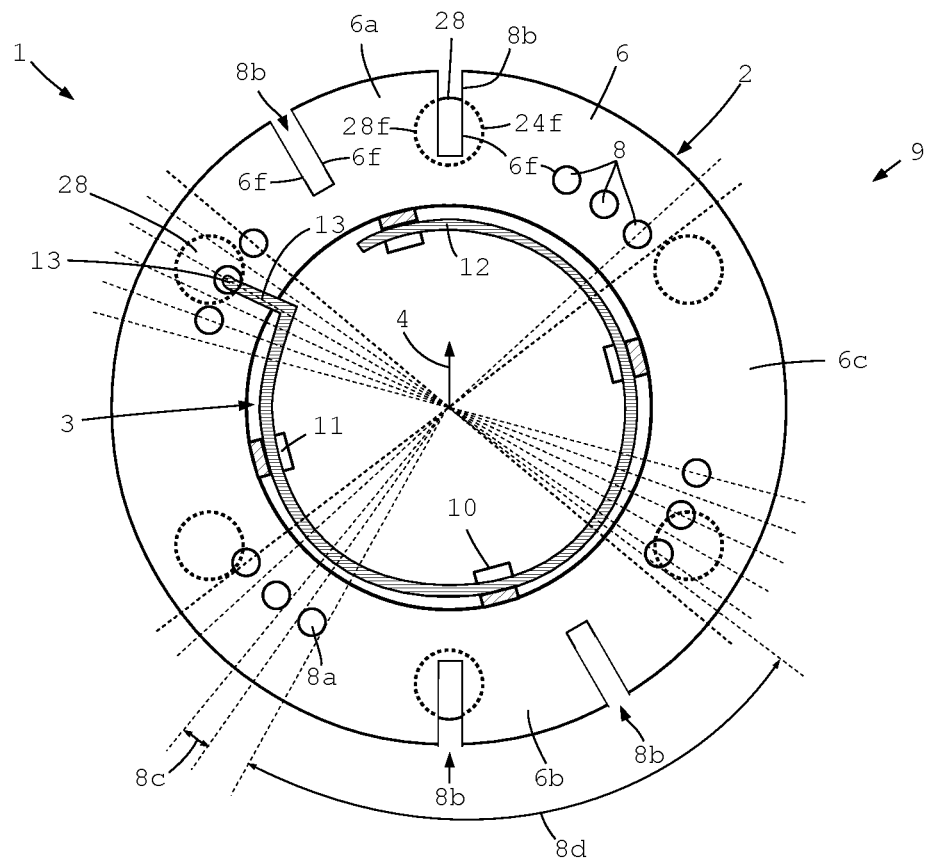
FIG. 12 another schematic illustration of a wheel component according to the application.

FIG. 12 finally shows a modification and an exemplary embodiment of a wheel component 1 in a simplistic view, illustrating an axial view of the fixing ring 2. The tube unit 7 with the thread 7a, configured behind the plane of the drawing and thus not visible, runs in the axial direction. One can identify the fixing unit 6, which is in turn configured as a circumferential flange 6c (entirely circumferential or circumferential in sections), or comprising for example separate fixing sections 6a, 6b.

On or in the fixing sections 6a, 6b, or between two fixing sections 6a, 6b, axial through holes 8 may be configured, which may be configured as simple through holes 8a, or as radially open grooves 8b. The axial cavities 8 are limited in the circumferential direction by at least one wall 6f.

It is also possible and particularly preferred for the axial through holes 8 to be configured as through holes 8a over the circumference of the fixing unit 6 or the fixing flange 6c. In the illustration according to FIG. 12, three approximately opposite through holes 8 are shown, the indicated radii showing that the through holes grouped in threes are disposed at an offset in the peripheral direction of half angular distances each, on opposite sides. This effects increased stability on the fixing unit 6 and simultaneously, larger covering of the through holes 8, at least one of which is intended to align with an axial cavity 28.

In the case of configurations where a brake disk is accommodated through what is called a 6-hole mount in a disk holder 21, the bolts 24 are usually disposed on the disk holder 21 at circumferential distances of 60°. Two immediately opposite through holes 8 on the fixing unit 6 thus do not increase the chance of a through hole 8 aligning with an axial cavity 28. A configuration of opposite through holes 8 offset by half an angular distance in the circumferential direction, considerably increases the chance of an aligned configuration of an axial through hole 8 with an axial cavity 28.

A number of through holes 8 are disposed over the entire circumference of the fixing flange 6c in an adapted pattern, so that axial alignment of a through hole 8 with an axial cavity 28 is generally enabled, in particular if one takes into account that a certain amount of increase or decrease of the required screwing momentum of the fixing ring 2 and the hub shell 51 is feasible.

It is also shown that a circumferential distance 8c of two through holes 8 differs from a circumferential distance 8d of two other axial through holes 8.

The difference to the preceding exemplary embodiments is that the tool socket 10 with the non-round contour is configured radially inwardly. Again it is possible for the securing spring 12 to block the tool socket 10 in the mounted state, to prevent applying a tool 60. To this end, the securing spring 12 is again received flexibly resiliently in a circumferential groove 11.

The securing arm 13 protrudes radially from the arcuate spring body, is again axially inserted into a through hole 8 and a corresponding axial cavity 28, and thus forms a safety lock and an anti-twist protection for the fixing ring 2.

In all the configurations it is not necessarily required for the axial cavity 28 to be configured in the disk holder 21. It is also possible to provide the axial cavity 28 on the brake disk. It has as a rule a number of cutouts 31 and disk apertures 38, which can likewise contribute to provide a safety lock and anti-twist protection.

Basically, only a limited return rotation of the fixing ring is required to prevent detachment of the brake disk device 20. In this respect, a contact surface in the brake disk device in the pertaining circumferential direction is sufficient.

All the configurations enable a reliable and simple securing of the brake disk device to a bicycle hub. The components are easy to manufacture and low-cost in production. Moreover, application of a tool is preferably prevented when the securing unit 3 is mounted.

While a particular embodiment of the present supporting wheel component with a fixing ring for attaching a brake disk device to a bicycle hub have been described herein, it will be appreciated by those skilled in the art that changes and modifications may be made thereto without departing from the invention in its broader aspects and as set forth in the following claims.

List of reference numerals:

| | | | |
|---|---|---|---|
| 1 | wheel component | 22 | internal toothing |
| 2 | fixing ring | 23 | arm |
| 3 | securing unit | 24 | bolt |
| 4 | radial direction | 24f | wall |
| 5 | axial direction | 25 | depression; hole in |
| 6 | fixing unit | | bolt |
| 6a, 6b | fixing section | 28 | cavity; |
| 6c | fixing flange | | aperture in 20 |
| 6d | external diameter | 28a | diagonal distance, |
| 6f | wall | | diameter |
| 7 | tube unit | 28b | diameter of 28 |
| 7a | thread | 27f | wall |
| 8 | through hole at 6 | 30 | brake disk |
| 8a | through hole, hole | 31 | cutout |
| 8b | groove | 31f | wall |
| 8c, 8d | circumferential distance | 38 | disk aperture axial aperture in 30 |
| 8e | diameter | 50 | bicycle hub |
| 9 | mounted state, secured state | 51 | hub shell |
| | | 51a | thread |
| 10 | tool socket | 51b | end region |
| 10a | non-round contour | 52 | shoulder |
| 10b | engagement component | 53 | toothing |
| 10c | axial groove | 54 | clamping system |
| 11 | circumferential groove | 55 | adapter |
| 11a | depth of 11 | 60 | tool |
| 12 | securing spring | 61 | engagement component |
| 12a | external diameter | 100 | bicycle |
| 12b | angle at circumference | 101 | wheel, front wheel |
| 13 | securing arm | 102 | wheel, rear wheel |
| 13a | length | 103 | frame |
| 13b | diameter | 104 | fork, suspension fork |
| 14 | spring body | 105 | rear wheel damper |
| 14b | wall thickness | 106 | handlebar |
| 20 | brake disk device | 107 | saddle |
| 21 | disk holder | 109 | spoke |
| 21a | longitudinal section | 110 | rim |
| 21b | diameter | 112 | pedal crank |
| 21c | disk holder part | | |

The invention claimed is:

1. A wheel component comprising:
a fixing ring for attaching a brake disk device to the hub shell of a bicycle hub;

and with a securing unit for securing the fixing ring;
wherein the fixing ring comprises a fixing unit extending in the radial direction;
and a tube unit extending in the axial direction on which a thread is configured to screw the thread of the tube unit with the thread on the hub shell and to attach the brake disk device to a bicycle hub;
the fixing unit comprises at least one axial through hole which is configured and disposed such that the at least one axial through hole is at least in partial axial alignment with a cavity in the brake disk device in the mounted state of the fixing ring, so that a securing arm of the securing unit can be inserted into the cavity of the brake disk device through the through hole in the fixing unit, so that the securing arm effects a safety lock for the fixing ring so as to prevent inadvertent detachment of the fixing ring; and
wherein said at least one axial through hole is configured as a radially open groove.

2. The wheel component according to claim 1, wherein a plurality of said cavities is configured distributed over the circumference of the brake disk device and wherein a plurality of said at least one axial through hole is configured over the circumference of the fixing unit.

3. The wheel component according to claim 2, wherein the distribution of the at least one axial through holes is selected such that the safety lock of the fixing ring is enabled in a variety of angular positions of the fixing unit.

4. The wheel component according to claim 1, wherein the fixing unit comprises said at least one fixing section extending in the radial direction, and wherein said at least one axial through hole is configured in the fixing section.

5. The wheel component according to claim 4, wherein said at least one axial through hole is configured between two adjacent said at least one fixing sections.

6. The wheel component according to claim 1, wherein the fixing unit comprises a circumferential fixing flange.

7. The wheel component according to claim 1, wherein the securing arm shows an arm diameter that is smaller than the diameter of the at least one axial through hole and the cavity, so that inserting the securing arm is possible even if the at least one axial through hole is not in perfect alignment with the cavity.

8. The wheel component according to claim 1, wherein the fixing ring comprises at least one tool socket showing a non-round contour, so that it can be gripped with an adapted tool and wherein the securing unit blocks the tool socket in the mounted state.

9. The wheel component according to claim 8, wherein the brake disk device is disposed on one axial side of the fixing unit in the mounted state, and the tool socket is configured on the other axial side of the fixing unit.

10. The wheel component according to claim 1, wherein a substantially circumferential groove is configured on the fixing ring.

11. The wheel component according to claim 1, wherein the securing unit comprises a securing spring with an arcuate spring body, from which the securing arm protrudes transversely and wherein the securing spring bears resiliently against the fixing ring in the mounted state.

12. The wheel component according to claim 10, wherein the circumferential groove is configured on a tool socket, and in the mounted state the securing spring is received in the circumferential groove of the tool socket.

13. The wheel component according to claim 12, wherein the circumferential groove has dimensions such that in the mounted state the spring body radially protrudes out of the circumferential groove and wherein the wall thickness of the spring body is greater than the depth of the circumferential groove.

14. The wheel component according to claim 12, wherein in the mounted state the spring body is received in the tool socket such that the tool cannot be applied to the tool socket.

15. The wheel component according to claim 13, wherein the wall thickness of the spring body is between 0.5 mm and 3 mm, and the external diameter of the securing spring is between 20 mm and 50 mm, and wherein thea length of the securing arm is between 3 mm and 12 mm.

16. The wheel component according to claim 1, wherein the spring body opens up a plane to which the securing arm is oriented transverse.

17. The wheel component according to claim 1, wherein the brake disk device comprises a disk holder and a brake disk, and wherein the disk holder can be non-rotatably connected with the bicycle hub and in the mounted state bears against a shoulder of the hub shell and wherein the disk holder comprises a plurality of axially protruding bolts, which can take up a brake disk.

18. The wheel component according to claim 17, wherein at least one said axially protruding bolt comprises the cavity which is accessible in the mounted state, and wherein in the mounted state the securing arm engages the cavity.

19. The wheel component according to claim 18, wherein a distal end of the at least one axially protruding bolt shows a surface property and a colour that is different from a major part of the disk holder.

20. The wheel component according to claim 1, wherein in the mounted state, the securing arm engages one of a disk aperture and a cutout of the brake disk as the cavity.

21. The wheel component according to claim 1, wherein said at last one through hole includes multiple adjacent through holes that each have the same circumferential distance.

22. The wheel component according to claim 21, wherein the circumferential distance of two said adjacent through holes differs from the circumferential distance of two other, said adjacent through holes.

23. The wheel component according to claim 1, wherein the external diameter of the fixing unit is larger than the diagonal distance of a plurality of said cavities.

24. A wheel component comprising:
a fixing ring for attaching a brake disk device to the hub shell of a bicycle hub; and with a securing unit for securing the fixing ring;
wherein the fixing ring comprises a fixing unit extending in the radial direction; and a tube unit extending in the axial direction on which a thread is configured to screw the thread of the tube unit with the thread on the hub shell and to attach the brake disk device to a bicycle hub;
the fixing unit comprises at least one axial through hole which is configured and disposed such that the at least one axial through hole is at least in partial axial alignment with a cavity in the brake disk device in the mounted state of the fixing ring, so that a securing arm of the securing unit can be inserted into the cavity of the brake disk device through the through hole in the fixing unit, so that the securing arm effects a safety lock for the fixing ring so as to prevent inadvertent detachment of the fixing ring; and
wherein the fixing ring comprises at least one tool socket showing a non-round contour, so that it can be gripped with an adapted tool and wherein the securing unit blocks the tool socket in the mounted state.

25. A wheel component comprising:
a fixing ring for attaching a brake disk device to the hub shell of a bicycle hub; and with a securing unit for securing the fixing ring;
wherein the fixing ring comprises a fixing unit extending in the radial direction; and a tube unit extending in the axial direction on which a thread is configured to screw the thread of the tube unit with the thread on the hub shell and to attach the brake disk device to a bicycle hub;
the fixing unit comprises at least one axial through hole which is configured and disposed such that the at least one axial through hole is at least in partial axial alignment with a cavity in the brake disk device in the mounted state of the fixing ring, so that a securing arm of the securing unit can be inserted into the cavity of the brake disk device through the through hole in the fixing unit, so that the securing arm effects a safety lock for the fixing ring so as to prevent inadvertent detachment of the fixing ring;
wherein the brake disk device comprises a disk holder and a brake disk, and wherein the disk holder can be non-rotatably connected with the bicycle hub and in the mounted state bears against a shoulder of the hub shell and wherein the disk holder comprises a plurality of axially protruding bolts, which can take up a brake disk; and
wherein at least one said axially protruding bolt comprises the cavity which is accessible in the mounted state, and wherein in the mounted state the securing arm engages the cavity.

* * * * *